Aug. 15, 1950   F. O. LUENBERGER   2,518,701
STOP DEVICE FOR PREVENTING REVERSE DRIVE

Filed Sept. 10, 1945   2 Sheets-Sheet 1

INVENTOR
Frederick O. Luenberger
BY John Flam
ATTORNEY

Aug. 15, 1950   F. O. LUENBERGER   2,518,701
STOP DEVICE FOR PREVENTING REVERSE DRIVE
Filed Sept. 10, 1945   2 Sheets-Sheet 2
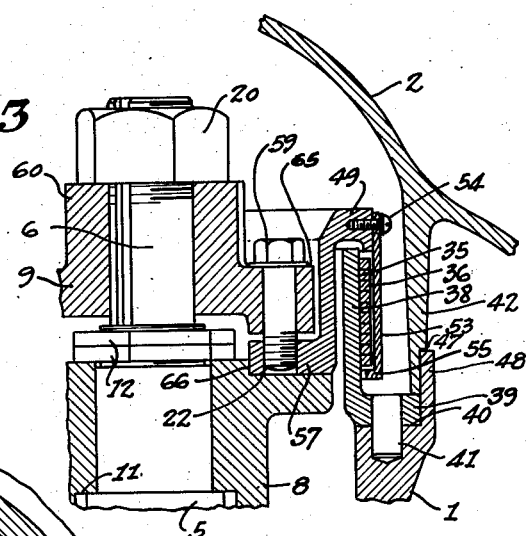
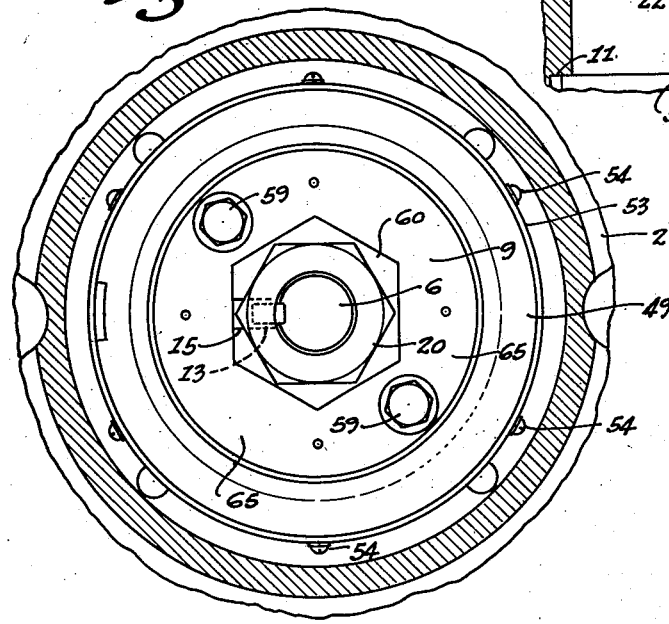
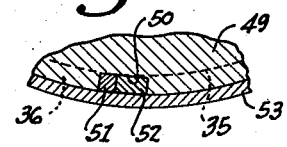
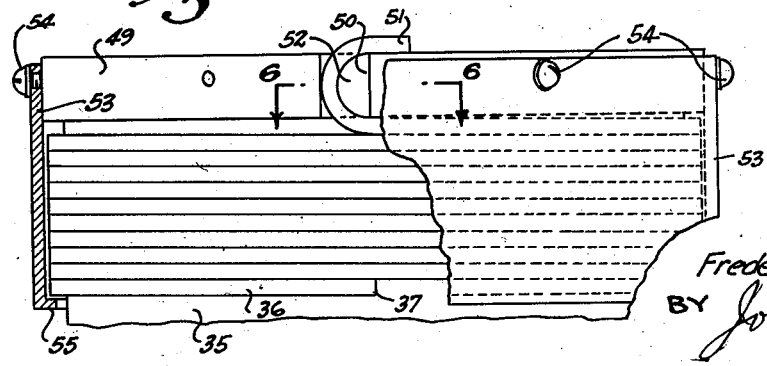
INVENTOR
Frederick O. Luenberger
BY John Flam
ATTORNEY Patented Aug. 15, 1950

2,518,701

UNITED STATES PATENT OFFICE 2,518,701

STOP DEVICE FOR PREVENTING REVERSE DRIVE

Frederick O. Luenberger, Los Angeles, Calif., assignor to U. S. Electrical Motors, Inc., Los Angeles, Calif., a corporation of California Application September 10, 1945, Serial No. 615,294

12 Claims. (Cl. 188—81)

This invention relates to a device for stopping motion of a rotatable device in the event rotation is reversed from the normal.

Although the invention is described in connection with vertical electric motors that are intended to operate pumps in a well, it may be embodied in other types of apparatus.

In the event the current to such a motor is interrupted, there is a reversal of the torque operating on the pump runners, urging the motor to run in a reverse direction. Such a reversal of rotation may be harmful, and devices are often provided to stop the motor from rotation other than in the normal direction.

Some of the most common forms of device for this purpose include a series of sloping teeth, the steep sides of which act as restraining abutments for pins that are carried by the rotor of the motor. Such schemes are objectionable because of the sudden jar imparted to the rotating parts at the instant of impact.

It is, accordingly, one of the objects of this invention to provide a non-reverse drive that operates in a gradual manner, whereby mechanical shock is obviated.

It is another object of this invention to make it possible to install such non-reverse drives, or to remove them, without interfering with the main drive elements.

In order to accomplish these results, use is made of a snubbing action progressively effective upon a stationary cylindrical surface when the rotary parts move in a direction opposite to normal rotation. It is therefore another object of this invention to provide a restraint against reverse rotation which operates on a snubbing principle, and which offers no resistance to the motion of the rotary mechanism in the normal, or forward, direction.

This invention possesses many other advantages, and has other objects which may be made more clearly apparent from a consideration of one embodiment of the invention. For this purpose there is shown a form in the drawings accompanying and forming part of the present specification. The form will now be described in detail, illustrating the general principles of the invention; but it is to be understood that this detailed description is not to be taken in a limiting sense, since the scope of this invention is best defined by the appended claims.

Referring to the drawings:

Figs. 2 and 4 are sectional views, taken along planes indicated by correspondingly numbered lines of Fig. 1;

Fig. 3 is a fragmentary, sectional view, taken along the plane indicated by line 3—3 of Fig. 2;

Fig. 5 is a fragmentary elevation, partly broken away, illustrating some of the elements of the device for preventing reverse rotation; and Fig. 6 is a fragmentary section, taken along a plane indicated by line 6—6 of Fig. 5.

Figure 1:
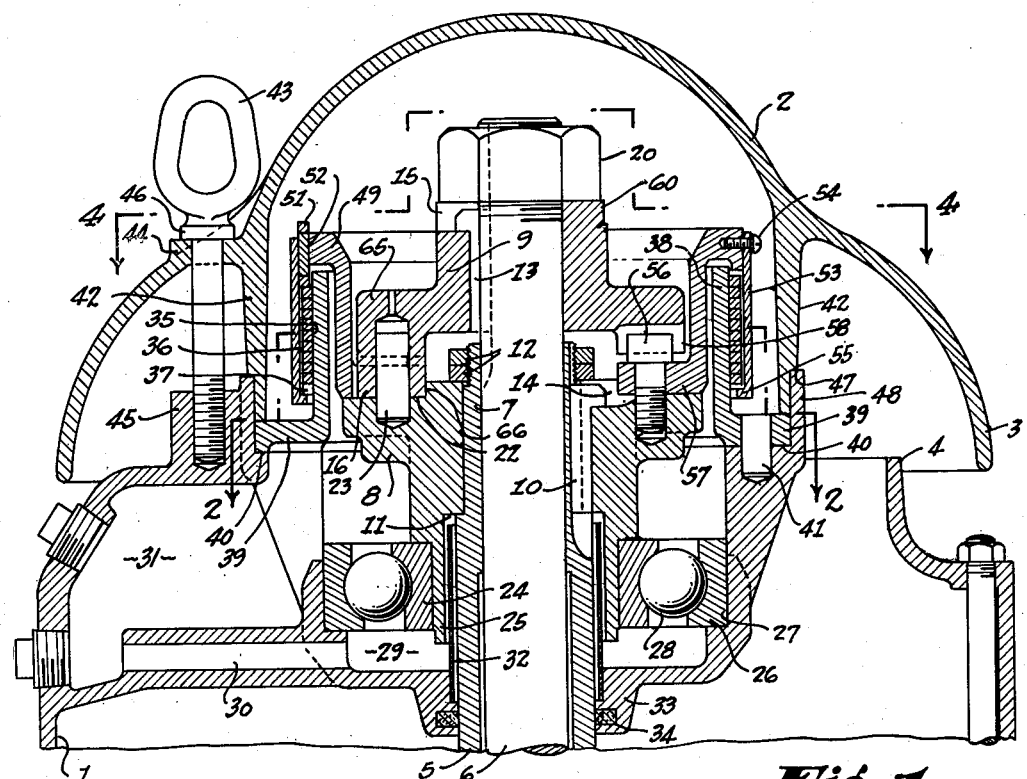
Figure 1 is a longitudinal sectional view, taken along a plane indicated by line 1—1 of Fig. 2, and illustrating a driving structure incorporating the invention, capable of being installed at the top of a vcertical electric motor.

In the present instance, an electric motor frame or casing 1 (Fig. 1) is illustrated, over which a weather-proof bell cap 2 is supported. This bell cap has an outer flange 3 overlapping and spaced outwardly from the upright flange 4 shown, in this instance, as integral with the casing 1.

The driving shaft 5 is shown in this instance as hollow, and through which a pump shaft extends. This pump shaft 6 has a sliding fit with the upper reduced portion 7 of the shaft 5, whereby it may be vertically adjusted to fit the conditions of operation of the pump.

The shafts 5 and 6 are coupled together by the aid of a drive, including the drive coupling members 8 and 9. The coupling member 8 is keyed to the shaft 5 as by the aid of the key 10. The member 8 has an internal shoulder 11 cooperating with a corresponding shoulder on shaft 5. Against this shoulder the drive coupling member 8 is urged, as by the aid of the nuts 12 disposed on the threaded end of the shaft 5.

The shaft 6 is keyed to the hub of the upper coupling member 9, as by a key 13. Appropriate slots, such as 14, 15 (Figs. 1 and 4) may be provided in coupling members 8 and 9 respectively to accommodate the heads of the keys 10 and 13.

Figure 2:
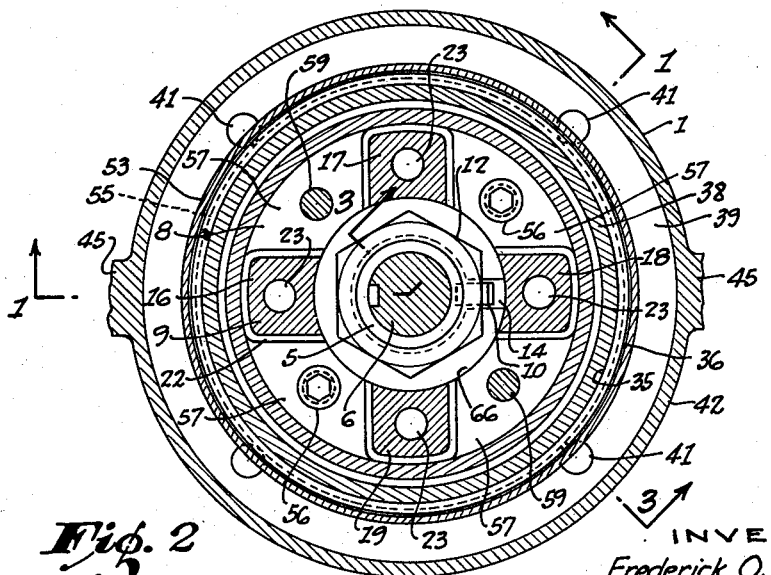

The upper coupling member 9 has four bosses or feet 16, 17, 18, and 19 (Figs. 1 and 2). These extend downwardly from the flange 65 of the member 9, and are generally radial with respect to the axis of rotation. The lower surfaces of these feet rest upon the upper annular surface 22, defined on the drive coupling member 8 by a shoulder 66. A nut 20, threaded on the end of the shaft 6, serves to prevent upward movement of the coupling member 9 with respect to the shaft 6. Each of the feet 16, 17, 18, and 19 is coupled to the coupling member 8 by the aid of the driving pins 23.

A thrust bearing structure is provided for rotatably supporting the shafts 5 and 6 adjacent the top of the frame 1. This bearing structure includes the inner race 24 disposed on a reduced lower portion 25 of the coupling member 8. The outer race 26 is disposed in an annular support 27 integral with the frame 1. A number of balls 28 are interposed between the races.

Provisions are made for maintaining the rolling elements in a lubricant. Thus, beneath the races 24 and 26, a lubricant well 29 is formed which communicates, as by passageway 30, with a space 31 leading to the top of the balls 28. A stationary sleeve member 32 is spaced around the shaft 5 and serves to define the inner annular wall of the well 29. Its lower end is disposed within a boss 33 of frame 1 and disposed beneath the well 29. A washer 34, made from felt, or the like, is held within the boss 33 and is in sealing contact with the shaft 5. Accordingly, oil may be supplied to the space 31 and the well 29 to a level not exceeding that represented by the top of the sleeve 32, without danger that it will escape downwardly on the outside of shaft 5. Rotation of the balls 28 serves to circulate the oil through the spaces between the balls and between the well 29 and the exterior space 31.

In the present instance, rotation of the shaft structure 5—6 is permitted in a counter-clockwise direction, as viewed in Figs. 1 and 4. However, by the aid of the elements now to be described, clockwise rotation is restrained.

For this purpose, use is made of a cylindrical surface 35 coaxial with the shaft structure 5—6, and a spring 36 coiled around the cylindrical surface. In this instance, the spring is made of a material having a substantially square cross section, as indicated clearly in Figs. 1 and 3. The upper end of the coil spring 36 is supported by the rotary structure in a manner to be hereinafter described. Its lower end 37, as shown most clearly in Figs. 5 and 6, is unattached or free. The turns are wound in a counter-clockwise direction, as viewed in Figs. 2 and 4.

When the rotary structure is stationary, the inner surfaces of the coils of spring 36 lightly grip the cylindrical surface 35. When the rotary structure rotates in a counterclockwise direction, centrifugal force acts upon the coils and causes disengagement between them and the cylindrical surface 35.

On the other hand, if rotation should be attempted in a clockwise direction, the turns of the spring 36 tend to coil themselves tightly around the stationary cylindrical surface 35; and rotation is effectively prevented by a snubber action. This restraint acts cumulatively along the helical area of contact on surface 35, and exerts a very strong grip before any centrifugal effect can be built up.

The cylindrical surface 35 is shown as provided on an upright flange 38 (Figs. 1, 2, and 3). This flange has an annular base 39 which rests on a shoulder 40 provided on the frame 1. Dowels 41 may be utilized between the base 39 and the frame 1. This base 39 may be held tightly against the surface 40 by the aid of the vertically depending flange 42 integrally formed with the bell cover 2. The lower surface of the flange 41 is urged against the upper surface of the base 39, as by the aid of a pair of eye bolts 43, only one of which is shown in Fig. 1. These eye bolts 43 are used for fastening the bell 2 to the structure, as well as for providing convenient anchor means for hoisting and transporting the assembled structure. Thus, for this purpose, the bell 2 may be provided with bosses 44 through which the shanks of the eye bolts may pass. The eye bolts thread into the threaded bosses 45 formed integrally with the casing 1. The collar 46, formed around the eye bolt, urges the bell 2 firmly into place. The lower end of the flange 42 is shown as provided with a shoulder 47 contacting the upper surface of the flange 48 formed around the surface 40.

The spring 36 is attached at its upper end to an annular support 49 (Figs. 1, 5, and 6). For this purpose the support 49 is provided with a slot 50 through which the bend 51 of the spring 36 can pass. A semi-circular filler piece 52 is inserted in the space formed between the concave side of the bend 51 and the right-hand side of the slot 50. The support 49 also provides a convenient support for an external sleeve 53 that surrounds the spring 36 and forms a guard against its outward movement under the influence of centrifugal force. This guard 53 may be attached at its upper end to the support 49, as by a number of screws 54. At the lower end of the guard 53, there may be a shallow internal flange or collar 55 serving as a stop against downward movement of the lower end of the spring 36.

The support 49 is attached to the drive coupling 8, as by the aid of the screws 56. Two of these screws are used (Fig. 2), passing through the feet 57 formed integrally with the support 49 and interlaced with the feet 16, 17, 18, and 19 of the upper drive coupling member 9. This coupling member 9 may be provided with appropriate recesses 58 (Fig. 1) for clearing the tops of the screws 56.

Two additional screws 59, illustrated in Figs. 2 and 3, pass through the flange 65 of coupling 9 and are threaded into the feet 57 of the support 49. These screws serve to urge the coupling 9 tightly against the surface 22 of the lower coupling 8. The upper coupling 9 furthermore has a hexagonal portion 60, by the aid of which it may be restrained or held during the process of assembly of the parts, or adjustment of the vertical position of shaft 6.

The omission or removal of the restraint, including the member 38 and the spring 36, does not in any way alter the relative axial positions of the drive coupling members 8 and 9. The screws 56, in that case, are likewise omitted. In that event, the screws 59, shown in Fig. 3 as threaded into the base 57, may be threaded, instead, in the threaded apertures formed in the upper surface of the coupling member 8 for the accommodation of the bolts 56. For this reason, screws 56 and 59 are all uniformly spaced on a common circle, as shown most clearly in Fig. 2; and they are made with identical threads.

The inventor claims:

1. In combination: a rotary structure; a non-rotary structure; and means preventing motion of the rotary structure in one direction of rotation, comprising means forming a stationary cylindrical surface coaxial with said structures; a coiled gripper disposed around said surface, and having an end carried by the rotary structure, and having its other end free; said gripper being acted upon by centrifugal force during normal rotation of the rotating structure to free said gripper from said surface; and a guard extending around the gripper and also carried by the rotary structure.

2. In combination: a hollow rotary shaft; a second shaft extending through the hollow shaft; drive coupling units carried respectively by said shafts; a support attached to one of the units; said support having feet disposed between feet formed on the other of the units for permitting removal and replacement of said support without disturbing the relative axial positions of the units;

means forming a non-rotary cylindrical surface coaxial with the shafts; and a coiled gripper disposed around the surface, and having an end attached to the support, and having its other end free, said gripper being acted upon by centrifugal force during normal rotation of the shafts to free said gripper from said surface.

3. In combination: a hollow rotary shaft; a second shaft extending through the hollow shaft; drive coupling units carried respectively by said shafts; a support attached to one of the units; said support having feet disposed between feet formed on the other of the units for permitting removal and replacement of said support without disturbing the relative axial positions of the units; means forming a non-rotary cylindrical surface coaxial with the shafts; a coiled gripper disposed around the surface, and having an end attached to the support, and having its other end free, said gripper being acted upon by centrifugal force during normal rotation of the shafts to free said gripper from said surface; and a cylindrical guard attached to the support and extending around the gripper.

4. In combination: a hollow rotary shaft; a second shaft extending through the hollow shaft; drive coupling units carried respectively by said shafts; a support attached to one of the units; said support having feet disposed between feet formed on the other of the units for permitting removal and replacement of said support without disturbing the relative axial positions of the units; means forming a non-rotary cylindrical surface coaxial with the shafts; and a coiled spring having one end attached to the support, and its other end free, said spring being disposed around the cylindrical surface, and arranged in a resilient manner lightly to grip the said surface when the shafts are stationary, the direction of the spring coils being such that rotation of the rotary structure in a reverse direction from the desired direction winds the coils more tightly against the cylindrical surface.

5. In combination: a hollow rotary shaft; a second shaft extending through the hollow shaft; drive coupling units carried respectively by said shafts; a support attached to one of the units; said support having feet disposed between feet formed on the other of the units for permitting removal and replacement of said support without disturbing the relative axial positions of the units; means forming a non-rotary cylindrical surface coaxial with the shafts; a coiled spring having one end attached to the support, and its other end free, said spring being disposed around the cylindrical surface, and arranged in a resilient manner lightly to grip the said surface when the shafts are stationary, the direction of the spring coils being such that rotation of the rotary structure in a reverse direction from the desired direction winds the coils more tightly against the cylindrical surface; said coils, when the shafts rotate in the desired direction, being freed from the surface by centrifugal force; and a guard extending around the coils and carried by the support.

6. In combination: a rotary structure; a non-rotary structure having a stationary cylindrical surface; said structures being disposed one within the other; and a coil gripper disposed around said surface and carried by the rotary structure; said gripper being constructed and arranged to grip said surface lightly when the parts are stationary so that centrifugal force acting on said gripper during its normal rotation with the rotating structure will move said gripper outwardly away from contact with said stationary surface.

7. In combination: a rotary structure; a non-rotary structure having a stationary cylindrical surface; said structures being disposed one within the other; and a coil gripper disposed around said surface and carried by the rotary structure; said gripper being so constructed and arranged that centrifugal force acting thereon during its normal rotation with the rotating structure will move said gripper outwardly away from contact with said stationary surface.

8. In combination: a rotary structure; a non-rotary structure having a stationary cylindrical surface; said rotary structure being disposed within said non-rotary structure; and a coiled gripper carried by the rotary structure and disposed around the exterior of said surface to tightly grip said surface upon reverse rotation of said rotary structure.

9. In combination: a stationary structure having an external cylindrical surface; a rotary structure within said stationary structure; and a coil gripper carried by said rotary structure and disposed on the outside of said cylindrical surface; said gripper being constructed and arranged to grip said cylindrical surface lightly when said rotary structure is stationary so that centrifugal force acting on said gripper during its normal rotation with the rotary structure will move said gripper outwardly away from contact with said cylindrical surface.

10. In combination: a non-rotary structure having an external cylindrical surface; a rotary structure within said non-rotary structure; and a coil gripper carried by said rotary structure and disposed on the outside of said cylindrical surface to grip said surface lightly when said rotary structure is stationary; said gripper being so constructed and arranged that rotation of said rotary structure moves said gripper outwardly away from contact with said external cylindrical surface.

11. In combination: a non-rotary structure having an external cylindrical surface; a rotary structure within said non-rotary structure; and a coil gripper secured to the end of said rotary structure and disposed on the outside of said cylindrical surface to grip said surface lightly when said rotary structure is stationary; said gripper being so constructed and arranged that rotation of said rotary structure moves said gripper outwardly away from contact with said external cylindrical surface.

12. In combination: a rotary structure; a non-rotary structure; and means preventing motion of the rotary structure in one direction of rotation, comprising means forming a stationary surface coaxial with said structures, a coiled gripper disposed around said surface, and having an end carried by the rotary structure, and having its other end free; said gripper being acted upon by centrifugal force during normal rotation of the rotating structure to free said gripper from said surface; and a guard extending around the gripper and also carried by the rotary structure.

FREDERICK O. LUENBERGER.

REFERENCES CITED

The following references are of record in the file of this patent:

UNITED STATES PATENTS

| Number | Name | Date |
| --- | --- | --- |
| 677,872 | Locke | July 9, 1901 |
| 2,299,765 | Rauen | Oct. 27, 1942 |